(12) United States Patent
Animesh et al.

(10) Patent No.: US 11,262,926 B1
(45) Date of Patent: Mar. 1, 2022

(54) OPTIMAL-PATH FINDING ALGORITHM FOR DATA ON STORAGE MEDIA

(71) Applicant: Amazon Technologies, Inc., Seattle, WA (US)

(72) Inventors: Rishabh Animesh, Seattle, WA (US); Jan Dean Larroza Catarata, Seattle, WA (US); Siddharth Shah, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 33 days.

(21) Appl. No.: 16/365,491

(22) Filed: Mar. 26, 2019

(51) Int. Cl.
*G06F 3/06* (2006.01)
*G06F 16/901* (2019.01)

(52) U.S. Cl.
CPC ............ *G06F 3/064* (2013.01); *G06F 3/0611* (2013.01); *G06F 3/0673* (2013.01); *G06F 16/9024* (2019.01)

(58) Field of Classification Search
None
See application file for complete search history.

(56) References Cited

U.S. PATENT DOCUMENTS

| | | | | |
|---|---|---|---|---|
| 7,630,967 | B1 * | 12/2009 | Srivastava | G06F 16/2453 |
| 8,312,181 | B1 * | 11/2012 | Faith | G06F 3/0659 |
| | | | | 710/22 |
| 2012/0260047 | A1 * | 10/2012 | Haines | G06F 3/0613 |
| | | | | 711/154 |
| 2015/0169249 | A1 * | 6/2015 | Kalman | H04L 45/42 |
| | | | | 710/38 |
| 2020/0042216 | A1 * | 2/2020 | Zhang | G06F 16/9024 |

\* cited by examiner

*Primary Examiner* — Michael Alsip
(74) *Attorney, Agent, or Firm* — Davis Wright Tremaine LLP

(57) ABSTRACT

A computing system may generate a directed graph to access data stored in multiple locations or blocks of a data storage device or system. Cost values may be determined for each of multiple paths between nodes, representing the blocks or subsets of data. In some cases, nodes having a cost value between them that is less than a threshold may be combined into a single node. A master path, linking at least two of the multiple paths, between a start node and an end node, may be generated by iteratively selecting paths with a lowest cost. The number of paths considered for determining the lowest path cost may be limited by a complexity parameter, so as to optimize the path to access the data without introducing unbeneficial computational complexity.

20 Claims, 10 Drawing Sheets

OPTIMAL-PATH FINDING ALGORITHM FOR DATA ON STORAGE MEDIA

BACKGROUND

Data storage is an important problem in the field of computing. Many data storage technologies have been developed over the years, including solid state, optical, and magnetic storage techniques. Each technology has faced different challenges, but in general, developers of storage devices have attempted to increase data storage density, decrease access speed, and reduce costs as much as possible. For example, solid state storage devices generally provide rapid access to stored data, but are relatively expensive (per unit of data stored) when compared to magnetic or optical storage technologies. Magnetic disks are generally able to store more data than solid state memories at lower cost, while providing moderate access speeds. Directional and omnidirectional or non-directional media for storing data can both benefit from increases in access speeds and more efficient ways to access data from large data stores.

BRIEF DESCRIPTION OF THE DRAWINGS

Various techniques will be described with reference to the drawings, in which.

DETAILED DESCRIPTION

Figure 1:
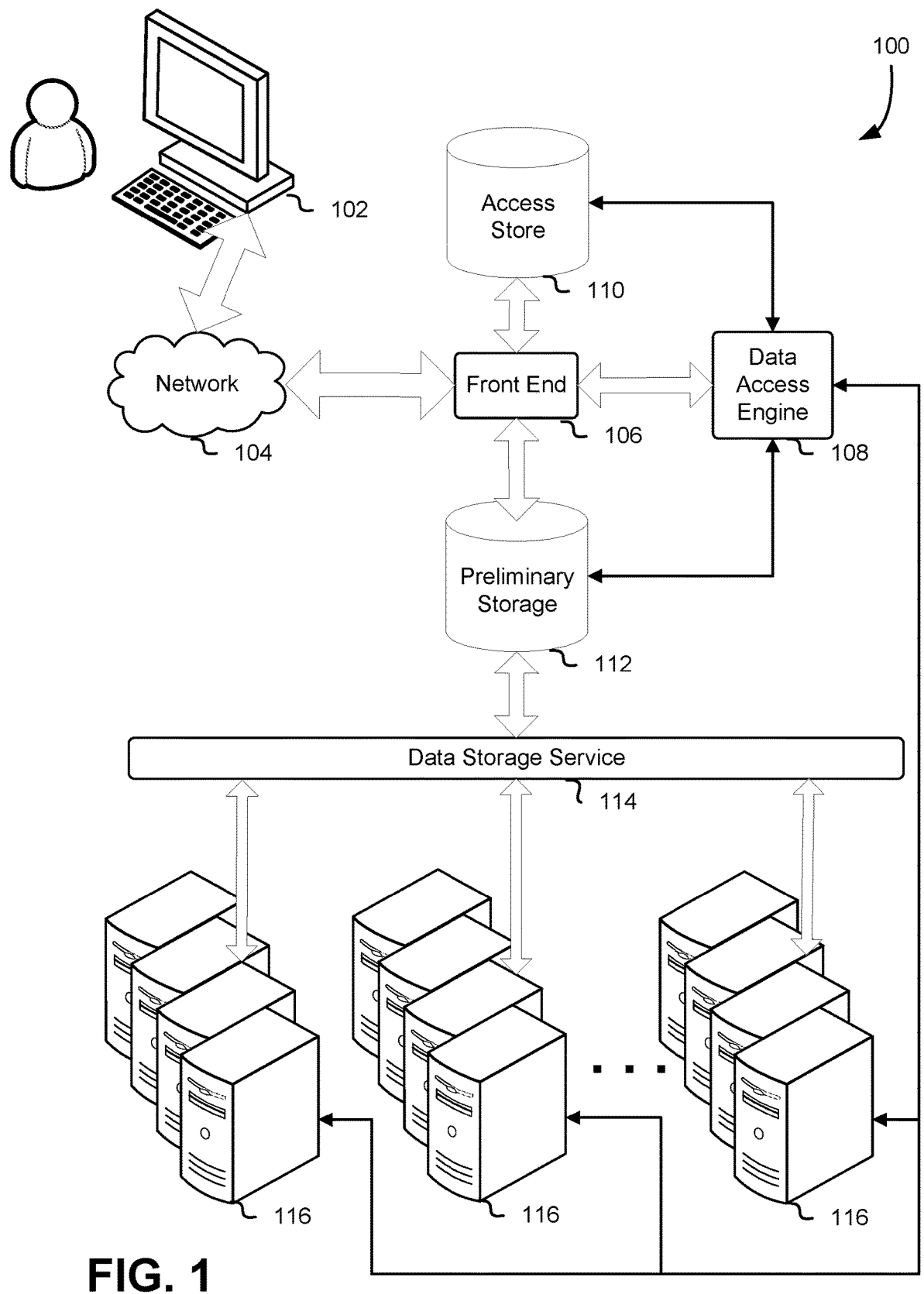
FIG. 1 illustrates an example environment in which an access engine orchestrates data access operations throughout a data storage system, including a data storage service, in accordance with some embodiments.

The present document describes techniques for efficiently accessing and retrieving data from a storage device via generating a graph in which locations on the storage device are represented by nodes of the graph. In some aspects, finding an optimal or efficient path to access data from different memory locations may be balanced against the complexity of finding an optimized path. Balancing the most efficient path with reducing computational complexity, in some cases, may include merging different memory locations or data blocks into a single node in the generated graph, such that the number of points to connect to form a master path through a subset of the nodes may be reduced. In some cases, memory locations or nodes having a cost or other value below a threshold may be suitable for merging. In yet some cases, balancing the most efficient path with reducing computational complexity may additionally or alternately include limiting the number of alternative paths from one node to another node that are considered, for example, by a depth or depth of calculation parameter of a decision graph, so as to reduce the amount of computation needed to determine a next path in a master path.

In some aspects, upon receiving a request to access data, a directed graph may be generated, for example, by a data storage service or component thereof, such as a data access engine, representing different blocks of subsets of data stored on a data storage device, via a number of nodes. Cost values may be determined for paths between the pluralities of nodes. The cost values may be based on hardware and/or software configurations of the data storage device, and may include at least one of a time between accessing data from one node of the plurality of nodes to accessing data from another node of the plurality of nodes, distance between nodes, movement characteristics of the data storage device in accessing data from one node of the plurality of nodes to accessing data from another node of the plurality of nodes, or other metrics. A master path may then be generated through the directed graph of nodes for retrieving the data indicated in the request. The master path may be generated by linking at least two paths sharing a common node, between a start node and an end node. The start node may indicate a current or starting read position of the data storage device. In the example of a magnetic tape device, this may include a starting or current location of a head assembly for reading data from one or more tape drives. The paths for linking may be selected to reduce a total cost value associated with the master path, according to a calculation complexity parameter. In some cases, the calculation complexity parameter may include a limit to the depth or number of nodes evaluated for selecting a next node in the path.

In some cases, the different paths may be ordered or sorted according to cost value. Generating the master path may include connecting multiple paths with nearest paths, for example, that share a common node, according to the ordered list of paths. The master path may begin at the start node. Next, a set of closest nodes from end of an optimal path (e.g., the start node) may be determined. If there is more than one node in set, for each node in the set, a shortest path with depth d (e.g., the calculation complexity parameter, which may be configurable) may be determined using remaining first nodes. The depth d may determine or affect the optimality of the produced path in case of multiple collisions. The shortest path may then be connected to the end of the master path, such as the start node or end of the last connected path. Multiple paths may be selected and added to the master path in a similar way until only one path remains. In this way a set of closest paths beginning at the start node may be iteratively determined to connect the start node to the end node, or to connect all of the nodes either indicated in a request for data, or in a given data storage device or system.

In some cases, two or more of the nodes may be combined into a single combined node, where the nodes that are combined have an access value that is less than a threshold, which may be configurable. In some aspects, the threshold value may be zero, such as in the case of directional storage media, including magnetic tapes, where two consecutive data blocks, represented by nodes, do not have an access value cost or edge weight associated with moving from one node to the other, in a given direction.

In some aspects, a number of the plurality of nodes that are combined to form the at least one combined node may be limited to decrease a total cost value of the master path, thus increasing calculation complexity. In some cases, the calculation complexity parameter and the limit of number of nodes to combine may be empirically determined to yield a more optimal path without adding undue complexity.

In some aspects, the master path may be dynamically adjusted, for example, based on additional requests to access data or for any number of other reasons.

As one skilled in the art will appreciate in light of this disclosure, certain embodiments may be capable of achieving certain advantages, including some or all of the following: (1) reducing the amount of time needed to access data in different memory locations of logical groupings of a data storage device, and (2) reducing computational complexity in determine how to efficiently access data.

FIG. 1 illustrates an example environment 100 in which a data access engine orchestrates data access operations throughout a data storage system, including a data storage service, in accordance with some embodiments. A customer device 102 connects, via a network 104, with the front end 106 of, e.g., a computing resource service provider providing a data storage service 114, so as to access data stored and managed by the data storage service 114 through preliminary storage 112, and durable storage 116 associated with data storage service 114. As may be contemplated, the client device 102, or some other actor (such as that of the computing resource service provider), may also request access to one or more sets of data stored by the data storage service 114. In some embodiments, information regarding the sets of data to be accessed may be recorded in an access table, which may be stored in an access store 110. The recorded information may include the identity of the data to be accessed, the time at which the request was received, identity of the user (e.g., customer of the computing resource service provider) requesting the data and/or that of the data to be accessed, the identity of the data's location within durable storage (e.g., the identity of the volume(s) or blocks on which the data is presently stored), and the like. The access requests recorded in the table are orchestrated by the access engine 108, either synchronously with the request or asynchronously, depending on the implementation.

The customer device 102 may be any computing resource or collection of such resources enabling the customer to interface with the data storage system, such as in a programmatic fashion (e.g., via web service call or application programming interface call), and access data therewith. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices (such as hard drives, optical drives, solid state devices, virtual storage devices such as provided by the computing resource service provider, and the like), services (e.g., such as those accessible via application programming interface calls, web service calls, or other programmatic methods), and the like.

The network 104 may be a communication network, such as the Internet, an intranet or an Internet service provider (ISP) network. Some communications from the customer device 102 to the data storage system may cause the data storage system to operate in accordance with one or more embodiments described or a variation thereof. The front end 106 may be any entity capable of interfacing via a network 104 with a customer device 102, as well as various other components of a data storage system, so as to coordinate and/or direct data and requests to the appropriate entities. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices, including both directional and omnidirectional or non-directional media (such as hard drives, optical drives, solid state devices, virtual storage devices such as provided by the computing resource service provider, and the like), services (e.g., such as those accessible via application programming interface calls, web service calls, or other programmatic methods), and the like.

The set of data may be produced by a program, process, application, module, service, or system associated with a computing resource service provider as described herein. The set of data may also be produced by a user or customer of the computing resource service provider, and submitted to the computing resource service provider via a customer device 102 and transmitted via a network 104. The set of data may include volatile data, which may be added to, changed, and/or deleted from in response to, for example, one or more requests (e.g., application programming interface requests or "API requests") made by the user or customer of the computer system. The set of data may also include non-volatile data (also referred to herein as "static data"), which may be at least partially unchanging as the one or more requests are received.

In an embodiment, the preliminary storage 112 is a data storage volume such as, for example, a magnetic disk drive (e.g., a spinning disk drive or a solid state disk drive), computer system memory, magnetic tape, or some other optical storage device. In another embodiment, the preliminary storage 112 is a virtual and/or shared data storage volume that is mapped to a physical storage volume such as, for example, a disk drive, a solid state disk drive, computer system memory, magnetic tape, or some other optical storage device. As may be contemplated, the types of data storage volumes used for the preliminary storage 106 described herein are illustrative examples and other types of data storage volumes used for the preliminary storage 112 may be considered as within the scope of the present disclosure.

In an embodiment, the preliminary storage 112 is a plurality of storage devices that are used to redundantly store the data using techniques such as, for example, bundle encoding, grid encoding, or replicated storage. For example, the preliminary storage 112 may store the data by distributing the data to a plurality of data shards (e.g., putting a first portion of the data in a first data shard and a second portion of the data in a second data shard) and generating one or more derived shards based on those data shards. In another embodiment, the preliminary storage 112 is one or more storage devices that store redundant copies of the data as received. In yet another embodiment, the preliminary storage uses a combination of the storage techniques described herein by, for example, storing a single copy of the data for a first time period (e.g., thirty minutes), storing multiple copies of the data for a second time period (e.g., one day), using redundant storage techniques such as grid or bundle encoding to store the data for a third time period (e.g., thirty days), and then moving the data to more durable storage 116 using the data storage service 114 as described herein.

The set of data may be stored in the preliminary storage 112 in an unaltered form (e.g., not processed, compressed, indexed, or altered prior to storage). The set of data may also be stored in the preliminary storage 112 as, for example, original data (also referred to herein as an "identity shard") such as the original data shards described herein. In an embodiment, the set of data stored in the preliminary storage 112 is stored without indexing and without any redundancy encoding. In another embodiment, the set of data stored in the preliminary storage 112 is stored with null redundancy encoding (i.e., a redundancy encoding that maps the data to itself). The data in preliminary storage may be stored as raw data, or may be bundle-encoded, or may be grid-encoded, or may be stored using some other method.

The preliminary storage 112 may have an associated durability that may be based on, for example, an annual failure rate ("AFR") of the data storage volume or the mapped data storage volume. For a given AFR, it may be assumed that the daily failure rate ("DFR") for the data storage volume or the mapped data storage volume is the AFR divided by three-hundred and sixty-five (i.e., the number of days in a year) and the hourly failure rate ("HFR") of the data storage volume or the mapped data storage volume is the DFR divided by twenty-four (i.e., the number of hours in a day).

In some embodiments, the set of data is migrated from the preliminary storage 112 to a data storage service 114 for storage in a durable data storage system 116. Similarly, upon receiving an access request for data stored in the data storage system, data may be temporarily retrieved from durable data storage system 116 and stored and compiled in the preliminary data store 112 prior to presentation to the customer device 102. In some of such embodiments, the migration may occur after a determined time period passes. The determined time period is selected so as to allow for the Shannon entropy of the system, e.g., keyed at least in part to the volatility or expected volatility of the set of the data, to decrease either on its own accord or via some active process (e.g., implemented by an entity of the computing resource service provider). For example, the determined time period may be based on the AFR, the DFR, and/or the HFR of the data storage volume or the mapped data storage volume, may be based on a desired durability of the data, may be based on the volatility of the data (e.g., the amount of changes in the data over the determined time period), or may be based on a combination of these and other such factors. In an embodiment, the volatility of the data (e.g., the amount of changes in the data over the determined time period) can be zero when, for example, the data does not change. Invariant data such as this may be migrated to durable storage more quickly than data that does change frequently. Conversely, data that does change frequently (e.g., highly volatile data) may not be migrated to durable storage at all and may, for example, be migrated to a different storage service as described herein, or simply remain in the preliminary storage 112.

In an embodiment, data can be migrated from preliminary storage to the data storage service 112 as a result of an event such as, for example, a request by a customer to store the data in the data storage service 114. Other events may also be used to cause the migration of the data from preliminary storage 112 to the data storage service 114 such as, for example, events generated by a process, module, service, or application associated with the customer or associated with a computing resource service provider. In an illustrative example, a block storage service may maintain data storage in preliminary storage for a running virtual machine instance and, upon termination of the instance, may generate an event to migrate some or all of the data from preliminary storage to durable storage. The triggering event that causes the migration of data from preliminary storage may also be combined with an elapsed time as described above so that, for example, data may be stored in preliminary storage until an event occurs, but the data may also be migrated from preliminary storage if no event occurs prior to the elapsed time.

As used herein, the durability of a data object may be understood to be an estimate of the probability that the data object will not unintentionally become permanently irretrievable (also referred to herein as "unavailable"). This durability is an estimated probability and is generally expressed as a percentage (e.g., 99.9999 percent). This durability is based on assumptions of probabilities of certain failures (e.g., the AFR of drives used to store the data) and may be based on an average failure rate, a maximum failure rate, a minimum failure rate, a mean failure rate, or some other such failure rate. The durability may be based on a statistical average of the failure over a collection of drives when there are many different drives and/or when there are many different types of drives. The durability may also be based on historical measurements of the failure of drives and/or statistical sampling of the historical measurements of the failure of drives. The durability may also be correlated with the probability that a data object or data block will not unintentionally become unavailable such as, for example, basing the durability on the probability that a data object or block will unintentionally become unavailable.

When the data is migrated or otherwise stored on the data storage service 114, the data storage service 114 may store the data using one or more redundancy encoding techniques. For example, the data storage service 114 may encode the data by producing one or more data shards and may store the one or more data shards on one or more volumes of a set of volumes of durable storage 116 configured to store the redundancy encoded data as described herein. Depending on the redundancy encoding technique used by the data storage service 114, some or all of the shards stored may consist entirely of original data (identity shards) or derived data (derived shards). In some embodiments, the shards may be apportioned on a one-to-one basis to the volumes 116 of the durable storage. Accordingly, in such embodiments, some volumes may include directly readable, original data (identity shards), while others contain only derived data (derived shards).

It should be noted that, as used herein, the durability of data and/or data storage may be separate from the redundancy of the data in the data storage. For example, data stored in preliminary storage 112 may be highly durable (i.e., have a very low failure rate) but may not be redundant if, for example, it is stored as a single copy. Conversely, data stored using one or more redundancy encoding techniques such as those described herein and while such data may be less durably stored (i.e., may have fewer "9's" of durability), it may be highly redundant. For example, data stored in a grid may have no fewer than four separate copies of the data (one of the data shard, one from the horizontally-derived shards, one from the vertically-derived shards, and one from the remaining shards). If the grid is geographically distributed into, for example, multiple datacenters, the data may have greater redundancy due to the added tolerance for loss of a complete datacenter.

During or after the storage process just described, a customer, through the customer device 102, may request access to a portion of the data stored and managed by the data storage system or service 114. As may be contemplated, to help facilitate efficient access to the data, an access engine 108 is employed to orchestrate efficiently accessing data from the data storage system. In some embodiments, the access engine 108 may obtain locations within the durable data storage system 116 of certain portions of sets of data, for example, corresponding to data indicated in a request from a customer device 102 to access data. In some examples, these locations may indicate certain blocks of data, for example, when the durable data storage system 116 provides block-level data storage. The access engine 108 may map the data blocks to a number of nodes in generating a directed graph for accessing the data. The access engine 108 may determine or obtain cost values associated with accessing different blocks of data in different orders. Based on these costs for certain paths between the data blocks, represented by nodes, the access engine may generate a master path for accessing the requested data. The data access engine 108 may then instruct the data storage service 114 to retrieve the requested data and compile the requested data in the preliminary store 112. Upon retrieval of all the requested data, a subset thereof, a time period elapsing, or a number of other factors, the front end 106 may facilitate transferring the retrieved data from the preliminary store 112 to the customer device 102, for example, via network 104.

In some cases, in connection with receiving an access request, an access table that may, for example, be stored in access store 110, is updated with information regarding the data to be accessed. The recorded information may include the identity of the data to be accessed, the time at which the request was received, identity of the user (e.g., customer of the computing resource service provider) requesting the data and/or that of the data to be accessed, the identity of the data's location within durable storage (e.g., the identity of the volume(s) on which the data is presently stored), and the like.

Either synchronously with the request (or the recording of the access request in the access table), or asynchronously therewith (e.g., at some point thereafter), the access engine 108 begins processing the requests recorded in the access table. In some embodiments, the requests recorded in the table are queued in an ordered queue, and the access engine 108 processes the requests in the order prescribed by the queue. In some embodiments, an entity of the computing resource service provider, such as the access engine 108 itself, sorts and batches the requests to improve efficiency. In some of such embodiments, the data access requests are batched and sorted such that the access engine 108 processes a plurality of requests for data durably stored in a given volume or area of durable data storage system 116 in one batch. As may be contemplated, the batching and sorting may be adjusted, either statically or dynamically, depending on the layering or other structure of the overall system in which the access process is implemented, as well as various performance aspects such as throughput, latency, system load, and the like. Furthermore, it is contemplated that in some embodiments, batching may occur without sorting, while in other embodiments, sorting may occur without batching.

The access engine 108 may be any computing resource or collection of such resources capable of interacting with other components of the computing resource service provider, so as to orchestrate and execute the access process as implemented. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., via application programming interface calls, web service calls, or other programmatic methods), databases (which may be implemented on one or more of the foregoing examples), and the like.

The access store 110 may be any computing resource or collection of such resources capable of storing information related to stored data, such as an access table identifying data to be accessed, and either storing and/or interfacing with one or more resources to provide that information regarding the access of data to other entities, such as the access engine 108, or other components of the computing resource service provider 100, such as the volumes of the data storage service. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices (such as hard drives, optical drives, solid state devices, virtual storage devices such as provided by the computing resource service provider, and the like), services (e.g., via application programming interface calls, web service calls, or other programmatic methods), databases (which may be implemented on one or more of the foregoing examples), and the like.

In some aspects, the described techniques may be particularly beneficial when employed with directional storage media, such as magnetic tape drives. It should be appreciated that other types of data storage devices, including other directional, or omnidirectional storage media, may also be beneficially utilized with the techniques described herein.

Figure 2:
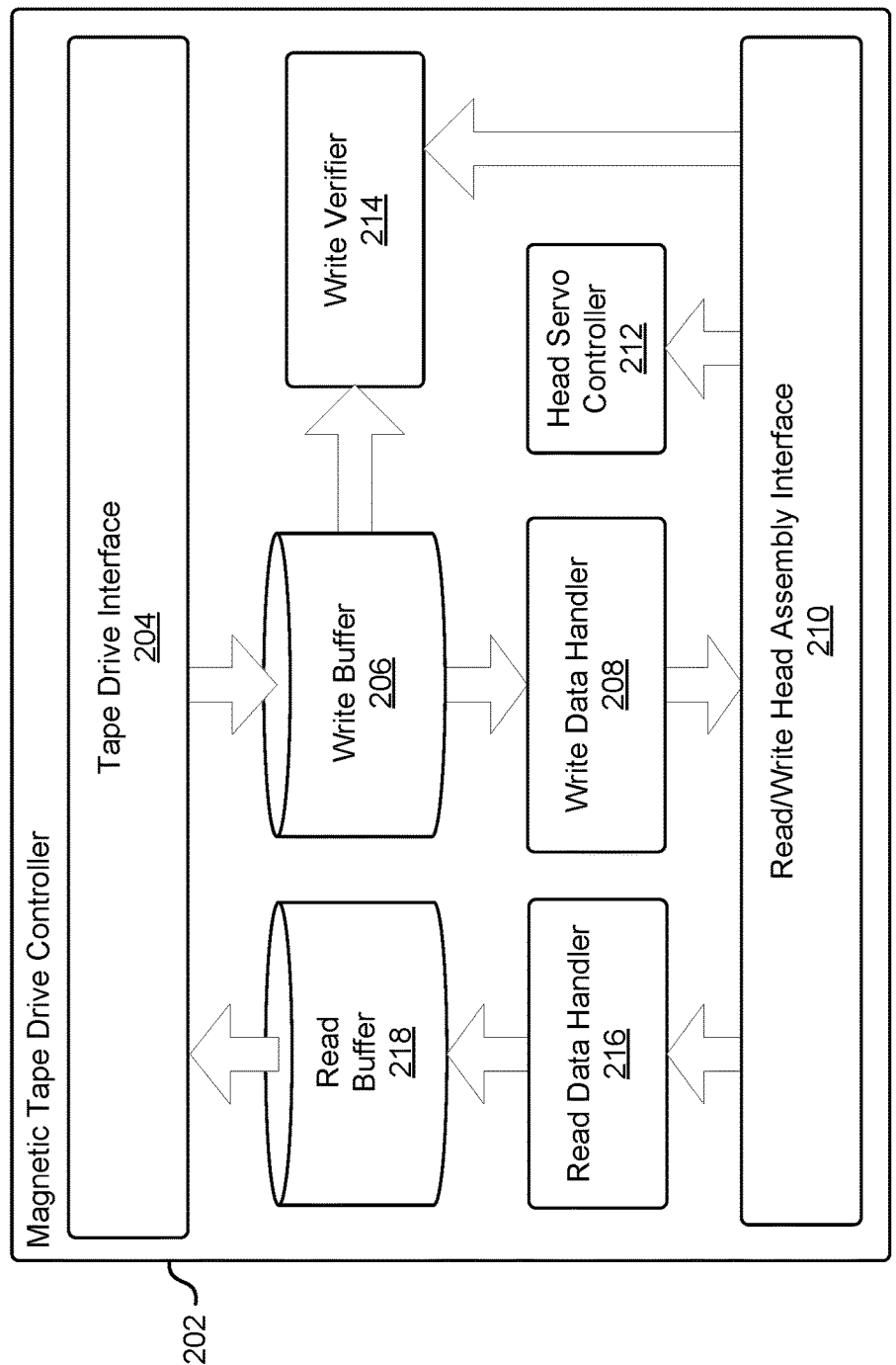
FIG. 2 shows an illustrative example of a magnetic tape drive controller that enables concurrent data read, write, and verification operations, in an embodiment.

FIG. 2 shows an illustrative example of a magnetic tape drive controller that enables concurrent data read, write, and verification operations, in an embodiment. A structure diagram 200 illustrates a magnetic tape drive controller 202 that is part of a tape drive. In some aspects, the tape drive controller 202 may be part of or incorporated into the data storage service 114 and/or the durable storage 116. The magnetic tape drive controller 202 is a computer system comprising a control board, a processor, and memory storing executable instructions that as a result of being executed by the processor cause the magnetic tape drive controller 202 to control the motors, servo motors, read and write heads, and other electrical components of the tape drive. The magnetic tape drive controller 202 includes a tape drive interface 204 that provides a physical interface that allows client computer systems, such as client device 102 or data storage service 114 to interface with the tape drive. The tape drive interface 204 can be a serial, parallel, wireless, or fiber-optic interface that allows commands to be submitted from a client computer system in accordance with a command structure supported by a command interpreter component of the drive software. The magnetic tape drive controller 202 includes a number of software components made up with executable instructions that are stored on a memory of the magnetic tape drive controller 202. The instructions of a software component, when executed, cause the magnetic tape drive controller 202 to manipulate physical components of the tape drive in a way that performs a command or part of a command issued by the client computer system. The magnetic tape drive controller 202 includes one or more elements that include software components. For example, software components may be included as part of the tape drive interface 204, a write data handler 208, a read/write head assembly interface 210, a head servo controller 212, a write verifier 214, and an advancer read data handler 216.

In some examples, the tape drive interface 204 is a small computer system interface ("SCSI") interface, intelligent drive electronics ("IDE") interface, or a serial advanced technology attachment ("SATA") interface. The command set supported by the tape drive interface 204 may be based at least in part on the physical interface standard supported by the tape drive. In general, commands may be included that read data from the disk drive, write information to the disk drive, format the disk drive, and perform other administrative operations related to media management.

For example, when a read command is received, by the magnetic tape drive controller 202, the magnetic tape drive controller 202 acquires location information of the data to be read. The head servo controller 212 facilitates moving the head assembly via interface 210 to the desired location. The read/write head assembly interface 210 acquires the read data from the head assembly, whereby the read data handler 216 processes and sends the data to the read buffer 218. From the read buffer 218, the read data can be processed by the tape drive interface 204 and sent to the data storage service 114, for delivery to the client device 102.

For example, when a write command is received by the magnetic tape drive controller 202, the magnetic tape drive controller 202 acquires the data to be written from a client computer system by the tape drive interface 204. The tape drive controller stores the data in a write buffer 206. In various examples, the write buffer 206 is a portion of solid state random access memory allocated for the temporary storage of data before the data is written to the magnetic tape. The magnetic tape drive controller 202 includes a write data handler 208. The write data handler 208 is a process running on the magnetic tape drive controller 202 that retrieves the data from the write buffer 206 and writes data to a magnetic tape using a read/write head assembly interface 210. In preparation for writing the data, the write data handler 208 positions the head assembly over the magnetic tape and winds the tape to a proper position for writing. The write data handler 208 advances the tape while writing the data to a write head on the head assembly via the read/write head assembly interface 210. The read/write head assembly interface 210 includes a physical interface and amplifiers that drive current to one or more write heads on the head assembly and receive signals received from one or more read heads on the head assembly.

In some examples, as data is read or written to the magnetic tape by the write data handler 208 or the advance read data handler 216, servo information is returned to the head servo controller 212. The head servo controller 212 uses the servo information to determine the position of the head assembly over the magnetic tape, and adjusts the position of the head assembly so that the head is positioned over the track to be written on the magnetic tape. In some aspects, the servo controller 212 may relay position information of the head assembly to the access engine 108, so that the access engine 108 can determine the current starting location or node for generating a master path for accessing data.

In some aspects, the access engine 108 may direct or control, either directly or indirectly though the data storage service 114, the magnetic tape drive controller 202 to access data from durable storage 116 and/or preliminary storage 112, according to a generated master path for accessing data in different locations of the data storage system. The data may be obtained by the read/write head assembly interface 210, and processed through the read data handler 216 and read buffer 218, and ultimately delivered via the tape drive interface 204 to customer device 102, in response to a request for data.

Figure 3:
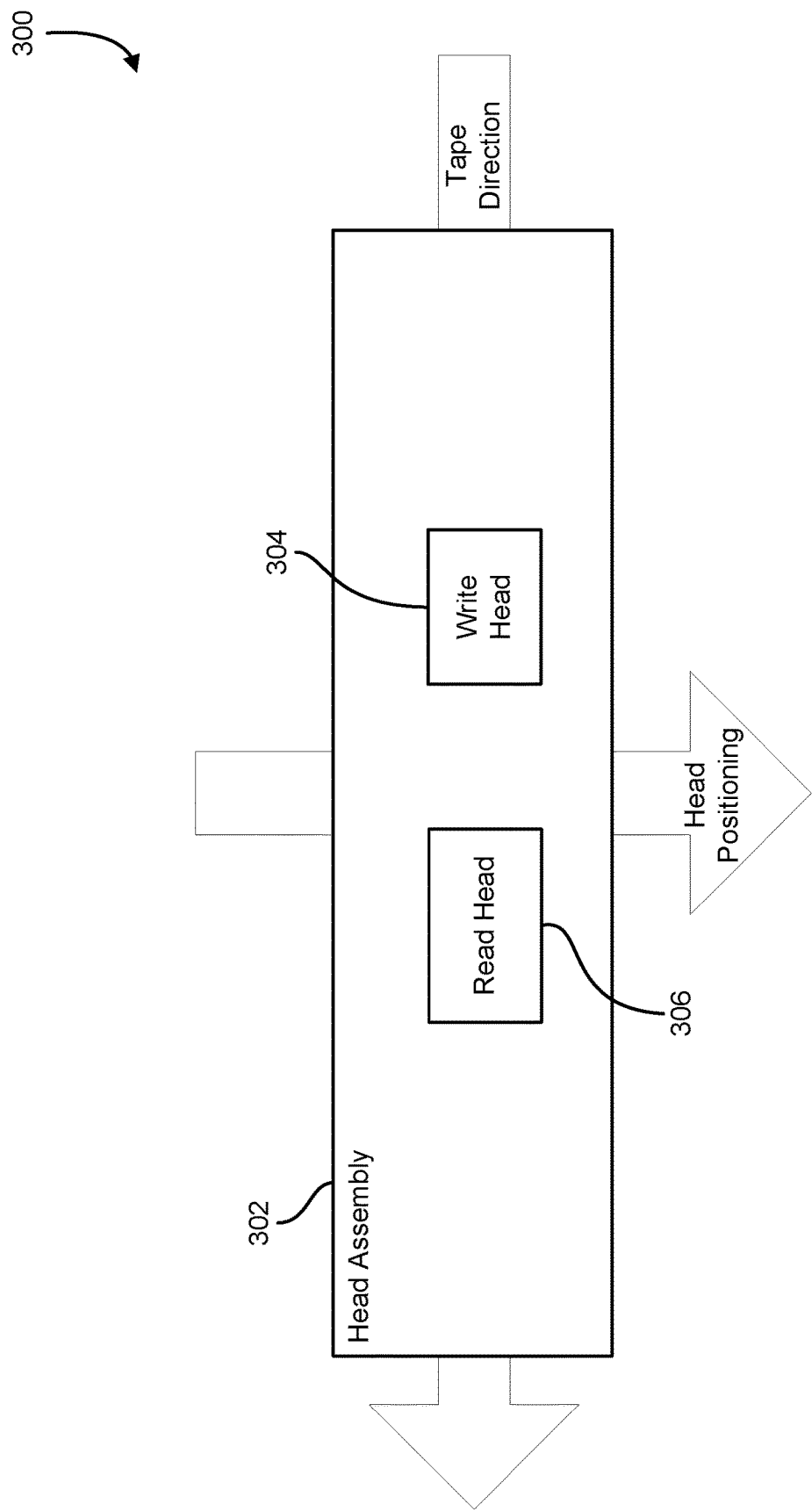
FIG. 3 shows an illustrative example of a head assembly that has a write head and a read head positioned for reading and writing data, in an embodiment.

FIG. 3 shows an illustrative example diagram 300 of a head assembly 302 of a magnetic tape storage device that has a write head and a read head positioned to enable reading and writing of data, in an embodiment. Head assembly 302 may be part of or interface with the read/write head assembly interface 210 of FIG. 2. The diagram 300 illustrates the position of the a read head 306 and a write head 304 on the surface of the head assembly 302 that is exposed to a magnetic tape having a plurality of data tracks. In an embodiment, as shown in FIG. 3, the magnetic tape is drawn across the surface of the head assembly 302 from right to left. Head assembly 302, as illustrated, is directional, meaning that it is configured to track magnetic tape in one direction. While the techniques described herein are particularly useful in directional data storage devices, such as including head assembly 302, it should be appreciated that omnidirectional data storage devices, including omnidirectional tape drives, can also be beneficially utilized.

The head assembly 302 is connected to a mechanism that allows a control board of a tape drive to move the head assembly 302 across the width of the magnetic tape. This allows the tape drive to read and write a plurality of parallel tracks to the magnetic tape in successive passes. In some implementations, after writing or reading a track to the magnetic tape, the control board rewinds the tape, advances the head assembly 302 across the width of the magnetic tape (downward as illustrated in FIG. 3), and writes or reads the next track to the magnetic tape. The amount that the tape drive advances the head assembly 302 controls the distance between adjacent tracks. In general, by positioning the tracks closer to each other, more tracks can be written on the magnetic tape, thereby allowing for larger amounts of data to be stored on the tape.

As the magnetic tape passes a write head 304, a control board of a tape drive energizes the write head 304, inducing a magnetic field that writes data to the magnetic tape. The head assembly 302 includes a read head 306. The read head 306 is positioned so as to read the data track, when the control board of the tape drive energies the read head 306. The arrangement of heads on the head assembly 302 is an illustrative example, and other head arrangements are possible based on the width of the available read heads.

Figure 4:
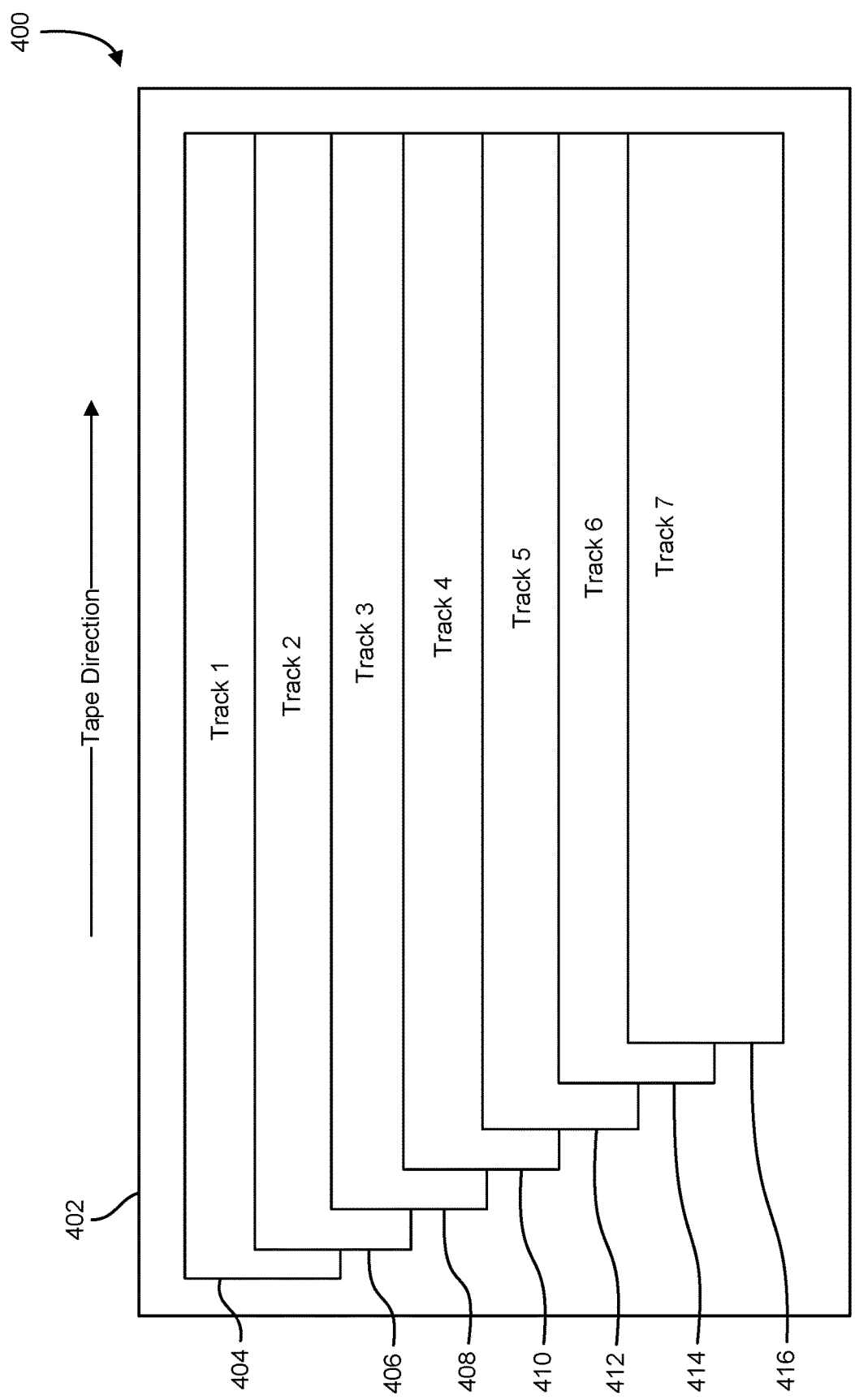
FIG. 4 shows an illustrative example of a magnetic tape with data tracks, in an embodiment.

FIG. 4 shows an illustrative example of a magnetic tape with various data tracks. Diagram 400 illustrates an example of a track pattern that can be created by a head assembly such as the head assemblies illustrated in FIG. 3. A piece of magnetic tape 402 includes a plurality of directional data tracks that can be read by head assembly 302. The plurality of data tracks includes a first data track 404, a second data track 406, a third data track 408, a fourth data track 410, a fifth data track 412, a sixth data track 414, and a seventh data track 416. To create the track pattern, a tape drive using a head assembly containing at least one write head records the tracks to the piece of magnetic tape 402 in numerical order from top to bottom as illustrated. Successive tracks may be written from right to left, from left to right, or in alternating directions.

Data may be read from the data tracks 404, 406, 408, 410, 412, 414, 416, in a directional pattern, such as right to left, left to right, or alternating. By the nature of the tracks being directional, some ways to access data in different locations on different tracks will be more efficient. For example, assume that tracks 1-7 are all directional and are written and read from left to right. Accessing a block of data located toward the left side of track 1 and then a data block on the right side of track 1 (relative locations), will be more efficient than accessing in the reverse order. Similarly, accessing data in track 1 and then track 7, given a starting location at track 1, will be more efficient than accessing the same data in the reverse order. In this ways, different costs, which can include time to access the data, energy needed to move the head assembly to access the data, or other factors, may be associated with different paths to access multiple pieces of data stored on tracks 404, 406, 408, 410, 412, 414, 416. With these costs, paths for accessing combinations of data may be determined to optimize the cost values and access the data more efficiently.

Figure 5:
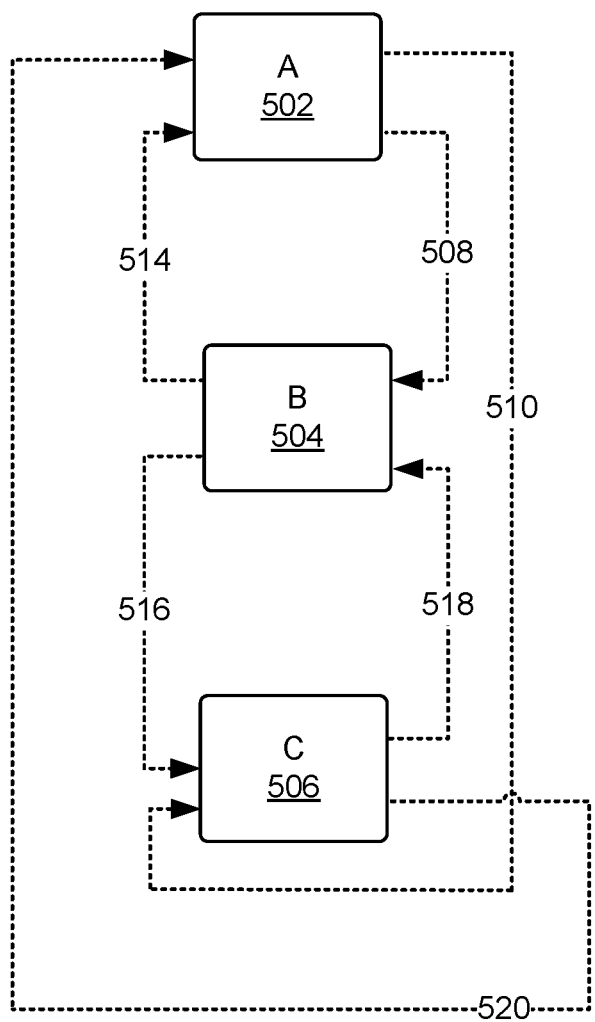
FIG. 5 shows an illustrative example of a directed graph including a number of nodes representing blocks of data with connections or paths between the nodes, in an embodiment.

FIG. 5 shows an illustrative example of a directed path 500 including a number of nodes representing a number of data blocks, for example, that may store data in a data storage system. In some aspects, the nodes may represent different subdivisions of data stored in a data storage system, such a data storage system 114 descried above in reference to FIG. 1. In some examples, the data may be stored in a block format, an object format, or a file system format. In some aspects, the directed graph 500 may include 3 nodes, node A 502, node B 504, and node C 506. As illustrated and described herein in reference to FIG. 5, the data storage device may be capable of jumping from one block of data to any other block of data, as represented by nodes. In some cases, each node may correspond to a single data block, data volume, or location of data, for example, provided by one or more data storage devices, such as durable storage 116 and/or preliminary storage 112 described above in reference to FIG. 1. In other cases, a single node may represent multiple blocks, locations, or other subdivisions of data provided by one or more data storage devices.

In some aspects, access engine 108 and/or data storage service 114 may generate directed graph 500 as a representation of the different blocks of data in the data storage system. In some cases, the access engine 108 and/or data storage service 114 may maintain and update the directed graph over time, such that as new data is stored and managed by the data storage service 114, the graph is updated, such as at specific time intervals, upon receiving new data, etc. In this way, the directed graph 500 may represent all the data stored in a given storage device or system. In other cases, the directed graph may be generated in response to a request to access data, such that the directed graph may not include all of the different subsets of data and their respective locations, as stored by a device or service, such as service 114.

In either case, using data obtained from or by the data storage service 114, different costs or value may be associated with different paths between nodes. These costs may be based on the hardware and/or software configurations of the data storage device or devices utilized by the data storage service 114. In one example, the cost value may include a time between accessing data from one data block (represented by a node) to another data block (also represented by a node), for example required by hardware, such as the head assembly 302, to physically move between different locations on a tape. In another example, the cost value may represent a physical or logical distance between blocks of data (represented by different nodes). In yet another example, the cost value may represent one or more movement characteristics of the data storage device in accessing data from one block to another block, including speed, velocity, acceleration, deceleration, and so on. In other examples, the cost value may represent any of a number of different metrics or characteristics that are based on accessing data stored in multiple places in a data storage device. In some cases the cost values for each path may be empirically derived, or may be approximated based on hardware and/or software configurations of the data storage device.

As illustrated, the access engine 108 or data storage service 114 may associate cost values with different paths between the different blocks of data. For example, cost 508 from node A 502 to node B 504, cost 516 from node B 504 to node C 506, and cost 520 from node C 506 to node A 502. In some examples, paths between adjacent blocks of data, or nodes, or separate paths, may be determined first, such as costs for paths 508, 516 and 520, assuming a directional orientation of data blocks represented by nodes A 502, node B 504, and node C 506, in that order. In some aspects, other costs for longer paths may then be determined, particularly in the case where many more nodes are in the graph 500 to represent all of the different data blocks, including paths/costs 510, and in some cases paths/costs 518 and 514, which may be counter to the normal operating direction of the data storage device. It should be appreciated that the described techniques are applicable to a variety of different memory devices, including both directional and omnidirectional storage media. The main difference between the two being the weight or cost associated to various paths between different subsets of data. In directional media, some edges or connections from a first node to a second node may be zero or have a zero eight, but the reverse edge or path will never be zero. Similarly, from a given node, only one edge can have a zero weight. Also, in a directional implementation, the weight from, for example node A 502 to node B 504 may be 20, while the weight from node B 504 to node A 502, may be greater, indicating against the preferred direction, such as represented by the greater value of 25. In some aspects, finding the lowest weight edge from a node may be a constant time operation. Table 1 indicated example values for different paths between nodes A 502, B 504, and C 506:

TABLE 1

| Path | Start Node | End Node | Cost Value |
| --- | --- | --- | --- |
| 508 | A 502 | B 504 | 20 |
| 516 | B 504 | C 506 | 15 |
| 520 | C 506 | A 502 | 10 |
| 510 | A 502 | C 506 | 30 |
| 514 | B 504 | A 502 | 25 |
| 518 | C 506 | B 504 | 30 |

In some cases, upon determining the costs or weights for each or a subset of the paths between the various nodes of graph 500, the paths may be sorted according to cost or weight. For example, according to Table 1, the sorted order may yield path 520 C→A, path 516 B→C, and path 508 A→B. In this example, traversing through all three nodes would yield a cost of 45, whereas other paths to traverse all of the nodes would be greater in cost. As such, this sorted order may then be used to select paths to connect to form a directed path through the nodes. In this way, computation may be reduce in later steps by first determining what is the most efficient paths to traverse each of the nodes in graph 500.

In some aspects, as will be described in greater detail below, one or more of nodes A 502, B 504, and C 506, may represent a path with a zero cost value associated with it or a cost value below a configurable threshold, or attentively, multiple nodes that have been combined. In some cases, nodes or paths with a zero cost value may be merged together and represented in the graph as a single node, to reduce complexity in determining an optimal route.

Figure 6:
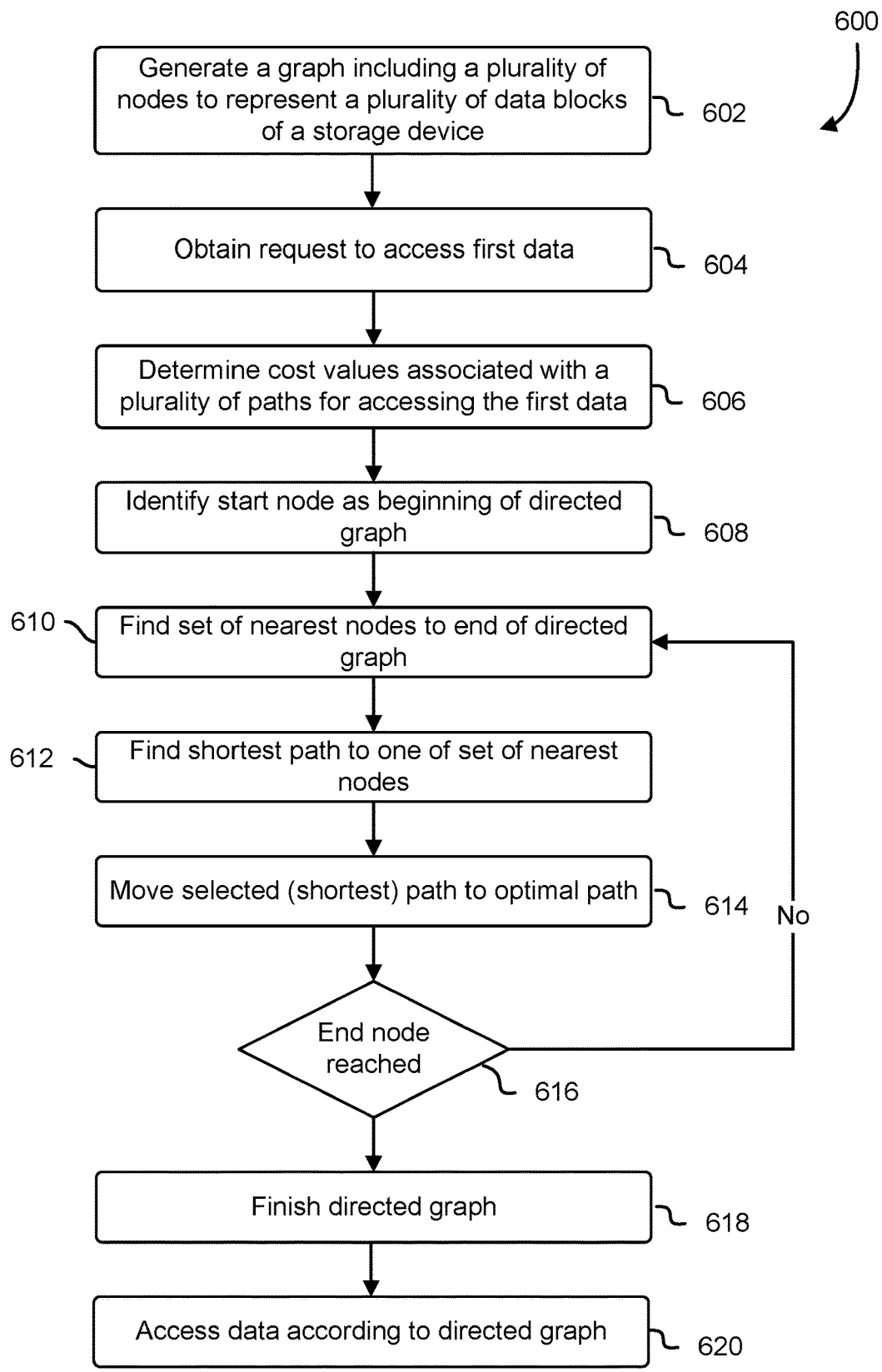
FIG. 6 shows an illustrative example of a process for determining a path for accessing and retrieving data from a number of data blocks represented by nodes in a directed graph.

FIG. 6 shows an illustrative example of a process 600 that determines a path for accessing and retrieving data from a number of data blocks represented by nodes in a graph. In some aspects, process 600 may be performed by the data access engine 108, data store 110, and/or data storage service 114 described above in reference to FIG. 1.

Process 600 may begin at operation 602, in which a graph including a plurality of nodes to represent a plurality of data blocks of a storage device may be generated. In some cases, the graph generated may be similar to graph 500 or graph 700, or a variant thereof, described in reference to FIGS. 5 and 7. Next, at operation 604, the data storage service may obtain a request to access first data, for example, from a client device, such as client device 102 over a network 104. In some cases, the request may be stored in a queue or table, such as in access store 110. Cost values associated with paths for accessing the first data from a number of nodes in the graph may be determined or obtained, at operation 606. In some cases, operation may be performed empirically, or may be approximated or determined based on hardware and/or software characteristics of the data storage device.

At operation 608, a start node of the directed graph may be identified. In some cases this may include querying and receiving head assembly 302 location information from a head tape drive controller 200 and/or a head servo controller 212. In other cases, this may include receiving other information from other types of data storage devices. At operation 610, a set of nearest nodes to the end of the directed graph may be determined (e.g., in the first iteration, from the start node). In some cases, nearest may be in terms of cost values, physical distance, logical distance, etc. Next, at operation 612, the shortest path to one of the set of nearest nodes may be determined, using the cost values. If the neighboring node is same as start of a different path, the new path may be joined with the master path. This may be done to avoid circular connections. At operation 614, the selected path may be moved or linked to the start node (e.g., the end of the directed graph). It may then be determined if the end node has been reached, at operation 616. In some cases, the end node may represent all of the data blocks being accessed by the directed graph. If the end node has not been reached, process 600 may cycle through operations 610, 612, 6714, and 616, until the end node has been reached. At that point, process 600 may proceed to operation 618, where the directed graph may be completed, whereby the data may be accessed according to the directed graph, at operation 620, and presented to the user device 102 over network 104.

In some aspects, paths may be sorted according to cost value. In this case, operation 610 and 612 may include selecting a path starting at the end of the optimal path with the lowest cost. In this way, by first sorting different paths, computational complexity for finding an optimal path may be reduced.

Figure 7:
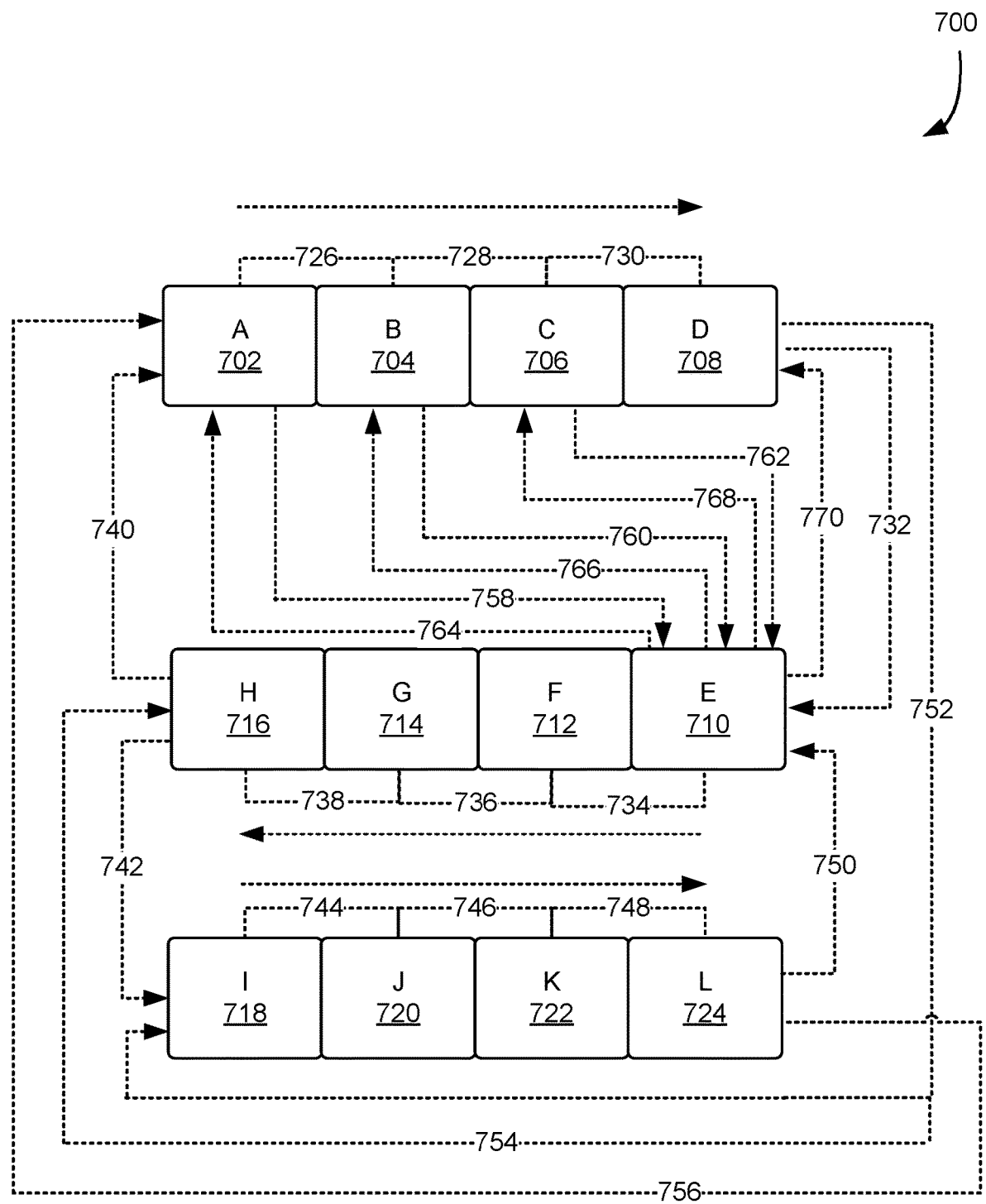
FIG. 7 shows another illustrative example of a directed graph including a number of nodes representing blocks of data with connections or paths between the nodes, in an embodiment.

FIG. 7 shows another illustrative example of a directed path 700 including a number of nodes representing a number of data blocks, for example, that may store data in a data storage system. In some aspects, the nodes may represent different subdivisions of data stored in a data storage system, such a data storage system 114 descried above in reference to FIG. 1. The data may be stored in a block format, an object format, or a file system format. In some aspects, the directed graph 700 may include a number of nodes 702-724. In some cases, each node may correspond to a single data block, location of data, volume data, etc., for example, provided by one or more data storage devices, such as durable storage 116 and/or preliminary storage 112 described above in reference to FIG. 1. In other cases, a single node may represent multiple blocks or other subdivisions of data provided by one or more data storage devices.

As illustrated, various paths 732-756 link two of the nodes among nodes 702-724. In some cases, nodes having a zero cost value to move between them may be combined into a single node. For example, node I 718 may be merged with node J 720, when cost 744 is zero. Alternatively, a cost threshold may be set that is a non-zero value, that when a cost falls below that threshold, nodes may similarly be merged.

In some cases, it may be beneficial to merge a large number of nodes, to reduce complexity of finding an optimal path, such as merging nodes I 718, J 720, K 722 and L 724 into a single node when paths 744, 746, and 748 are below a threshold cost, nodes E 710, F 712, G, 714, and H 716 into single node when paths 734, 736, and 738 are below a threshold cost, and A 702, B 704, C 706, and D 708 into a single node when paths 726, 728, and 730 are below a threshold cost. However, in some cases, it may be desirable to limit the number of nodes that are merged, in order to find a more optimal path. For example, if nodes A 702, B 704, C 706 and D 708 are all merged, it may result in more cost to access data from those individual nodes from another node, such as node E 710, when the cost to go from node E to, for example node B 704 or C 706 is less than going from node E 710 back to node A 702 (used to represent the combined node of nodes A-D) or other possible path to access the data from node B 704 or C 706. In other words, paths 760 and 762 may have a lower cost than path 758 in combination with 726 and 728 (which in this merging example, can assumed to be zero). In some cases, the number of nodes that are merged may be limited by a threshold number p, to balance computational complexity with the ability to find a more efficient path.

In a directional storage media example, each path would be directional, such as indicated by arrows in FIG. 7. Directional storage media may affect the balance between finding the most optimal path through a number of data nodes and computational complexity of determining the path. As the number of nodes that are merged increases, represented by parameter p, the optimality of the path decreases, and vice versa.

The differing complexities of finding an optimal path can be represented by the following:

Forming zero weight paths or merging nodes is $O(n)$.
Connecting with near paths is $O(n \log n)$.
Multiway merge is $O(d!n)$ in the worst case, where $O(1)$ in best case, and $O(d!k2)$ is the average case, where k is the number of paths.

Depending on the weight distribution, the first step or combining nodes or paths having below a threshold cost or weight may remove many nodes. In the directional example, this may include combining all nodes with one incoming zero weight and one outgoing zero weight. The path between such nodes can be deterministically said to be an optimal path. This step causes some loss of information based on the limit of the number of nodes that are merged or combined, which is represented by the parameter p. Increasing p may cause missing a more optimal path by traveling p−1 suboptimal number of nodes before moving to a more optimal path.

As an illustrative example, assume that the paths 726, 728, and 730 are zero lengths paths such that their cost is 0, whereby nodes A-D can be merged. Also assume the following paths costs, as indicated in Table 2:

TABLE 2

| Path | Start Node | End Node | Cost Value |
|------|-----------|----------|-----------|
| 758 | A 702 | E 710 | 10 |
| 760 | B 704 | E 710 | 20 |
| 762 | C 706 | E 710 | 40 |
| 732 | D 708 | E 710 | 45 |
| 764 | E 710 | A 702 | 1000 |
| 766 | E 710 | B 704 | 10 |
| 768 | E 710 | C 706 | 10 |
| 770 | E 710 | D 708 | 10 |

Based on p, the master path cost to traverse all 5 of the nodes can be represented as cost 20 for the path linking (AEBCD), 30 for the path linking (ABECD), 50 for the path linking (ABCED) or 45 for the path linking (ABCDE). The number of different paths each master path or directed graph are then 5, 3, 3, 2.

After determining a number of different paths, the next step is an optimization to reduce the k number of paths that are merged, where it can be deterministically said that concatenating two lists together will give the same result as performing the k-way merge. This step utilizes a conditional nearest neighbor algorithm or criteria. The nearest neighbor algorithm is known to provide an optimal path within 25% of the most optimal path on average The first two steps are O(n) optimizations which are used to reduce the k for the O(kd!) algorithm, which improves the overall complexity of the method. The k-way merge does not necessarily provide the most optimal path, based on number of collisions of minimum values. This optimality can be traded with performance using a calculation complexity parameter, or parameter d. Parameter d may represent the number of nodes that are tested to find an optimal from path from any given node. In some aspects, parameter d represents a depth value in a decision graph type analysis. If d=k, the complexity is O(k!) which is same as performing a complete search through all possible paths.

Figure 8:
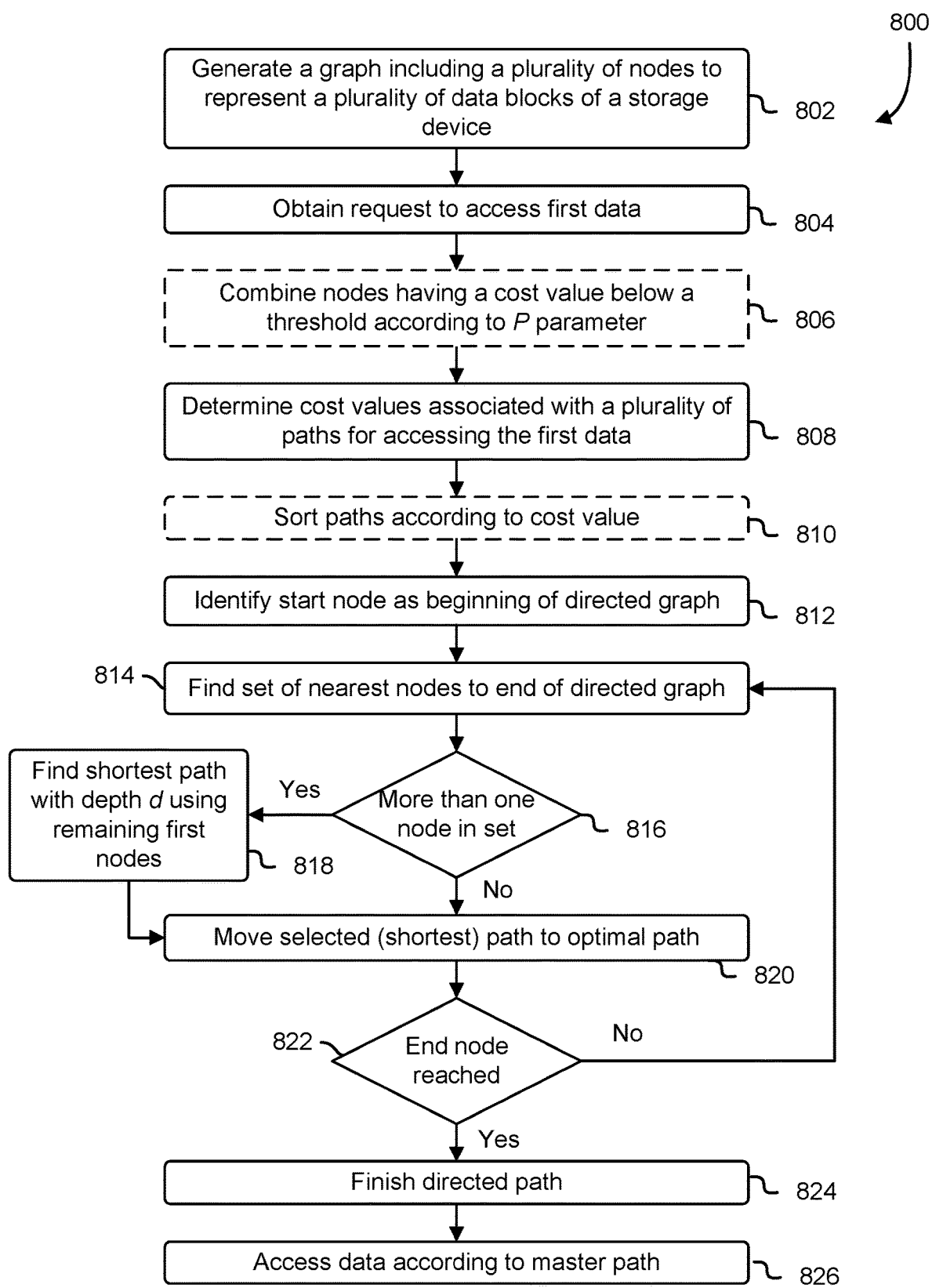
FIG. 8 shows another illustrative example of a process that for determining a path for accessing and retrieving data from a number of data blocks represented by nodes in a directed graph.

FIG. 8 shows another illustrative example of a process 800 that determines a path for accessing and retrieving data from a number of data blocks represented by nodes in a graph. In some aspects, process 800 may be performed by the data access engine 108, data store 110, and/or data storage service 114 described above in reference to FIG. 1. In some cases, process 800 may utilize a graph similar to graph 700 described above in reference to FIG. 7. In some aspects, process 800 may incorporate aspects of process 600 described above; those similar aspect swill not be described again in detail here. As illustrated in FIG. 8, dashed lines may indicate an optional operation, such that process 800 may be performed with or without the s indicated operation.

Process 800 may begin at operation 802, in which a graph including a plurality of nodes to represent a plurality of data blocks of a storage device may be generated. In some cases, the graph generated may be or incorporate aspects of graph 700, or a variant thereof, described in reference to FIG. 7.

Next, at operation 804, the data storage service may obtain a request to access first data, for example, from a client device, such as client device 102 over a network 104. In some cases, the request may be stored in a queue or table, such as in access store 110.

At operation 806, nodes in the graph may be combined that have a cost value below a threshold value. In some aspects the number of nodes that are combined, or the resulting number of combined nodes produced, may be limited by a configurable parameter p. This may be in order to ensure that a more optimal or efficient path is generated, balancing the optimality of the path with the computation complexity to determine the path. In some aspects, operation 806 may include first, merging all zero cost paths into single nodes. Next, nodes that have only outgoing zero-weight edges or cost values may be determined. Starting with these nodes, single or combined nodes may be created by adding nodes connected by zero-weights sequentially. In some aspects, a node may be merged with at most one starting node. These steps may then be repeated until at most p nodes have been merged, where, as p increases, the optimality of path decreases, while as p decreases, the complexity increases.

Cost values associated with paths for accessing the first data from a number of nodes in the graph may be determined or obtained, at operation 808. In some cases, operation 808 may be performed empirically, or may be approximated or determined based on hardware and/or software characteristics of the data storage device.

At operation 810, the different paths may be sorted or ordered according to cost value. This may enable the selecting of lower cost paths more efficiently (e.g., at operations 816 and 818 described below), by starting with the least cost path and testing each subsequently higher cost path until a suitable path is selected to form a master path.

At operation 812, a start node of the directed graph may be identified. In some cases this may include querying and receiving head assembly 302 location information from a head tape drive controller 200 and/or a head servo controller 212. In other cases, this may include receiving other information from other types of data storage devices.

At operation 814, a set of nearest nodes to the end of the directed graph or master path may be determined (e.g., in the first iteration, from the start node). In some cases, nearest may be in terms of cost values, physical distance, logical distance, etc.

If there is more than one node in the set of nearest nodes, as determined at operation 816, the shortest path to one of the set of nearest nodes may be determined using a depth limit or parameter d, based on cost values, at operation 818. If the neighboring node is same as start of a different path, the paths may be joined together. In some cases, operation 818 may include selecting a path having a common beginning node from the sorted list of paths generated at operation 810. Once a shortest or most efficient (available) path is selected, it may be linked or joined to the optimal or master path, at operation 822.

It may then be determined if the end node has been reached, at operation 822. In some cases, the end node may represent all of the data blocks being accessed by the directed graph or master path, and may not represent a specific node. If the end node has not been reached, process 800 may cycle through operations 814, 816, 818, 820, and 822, until the end node has been reached. At which point, process 800 may proceed to operation 824, where the directed graph may be completed, whereby the data may be accessed according to the directed graph, at operation 826.

Figure 9:
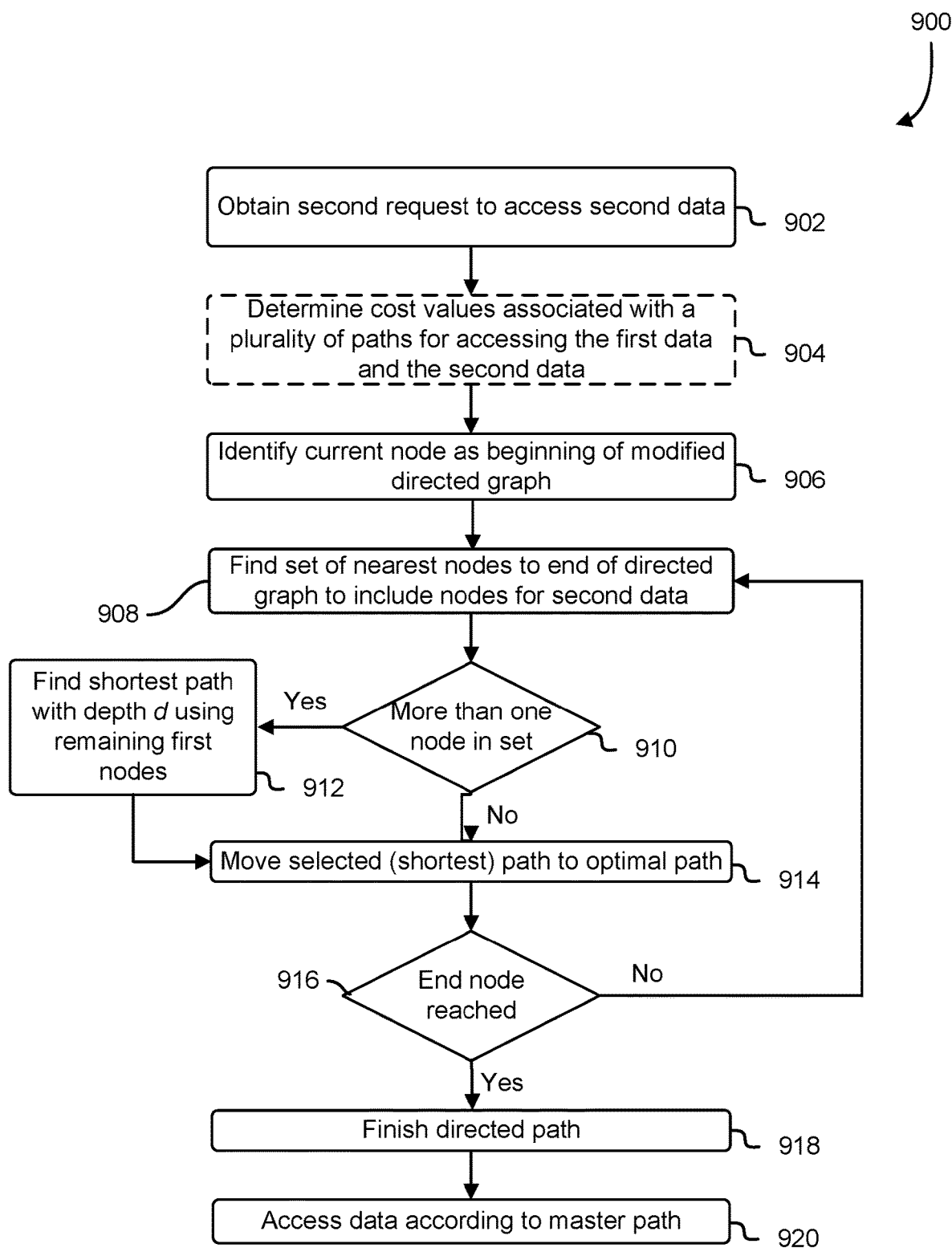
FIG. 9 shows another illustrative example of a process for determining a path for accessing and retrieving data based on multiple requests from a number of data blocks represented by nodes in a directed graph.

FIG. 9 shows another illustrative example of a process 900 that determines a path for accessing and retrieving data based on multiple requests from a number of data blocks represented by nodes in a graph. In some aspects, process 900 may be performed by the data access engine 108, data store 110, and/or data storage service 114 described above in reference to FIG. 1. In some cases, process 900 may utilize a graph similar to graph 700 described above in reference to FIG. 7. In some aspects, process 900 may interrupt or come after part or all of process 600 or 800 has been performed. As illustrated in FIG. 9, dashed lines may indicate an optional operation, such that process 900 may be performed with or without the so indicated operation.

Process 900 may begin at operation 902, in which the data storage service may obtain a second request to access second data, for example, from a client device, such as client device 102 over a network 104. In some cases, the request may be stored in a queue or table, such as in access store 110. In some cases, the second or subsequent request may be accessed from a queue in received order, or from a sported or organized order, such as a batch, etc. that may be been generated to increase efficiency of accessing various data sets. This may include sorting and/or batching requests based on at least one of time the request was received (priority), volume or location of a majority of the data (e.g., similar data locations will be processed together to increase access efficiency), or other characteristics.

Cost values associated with paths for accessing the first data and the second data from a number of nodes in the graph may be determined or obtained, at operation 904. In some examples, new costs for paths may be determined at operation 904. In other examples operation 904 may be omitted, as costs through various paths through a directed graph may have already been determined to access first data, and may include all the nodes necessary to access the second data in the new request.

At operation 906, a current node of the directed graph may be identified, for example corresponding to a current or expected future position of a data storage device. In some cases this may include querying and receiving head assembly 302 location information from a head tape drive controller 200 and/or a head servo controller 212. In other cases, this may include receiving other information from other types of data storage devices.

At operation 908, a set of nearest nodes to include nodes for the second data to the end of the directed graph or master path may be determined. In some cases, nearest may be in terms of cost values, physical distance, logical distance, etc. A modified path may then be iteratively determined and generated through operations 910, 912, 914, and 916, which may incorporate aspects of operations 814, 816, 818, 820, and 822, of process 800 described above. Upon reaching the end node, or until the master path includes all of the nodes to access the first and second data, process 900 may proceed to operation 918, where the directed graph may be completed, and the data accessed according to the directed graph, at operation 920.

It should be appreciated that modifying a current master path to incorporate nodes to access a new or modified set of data may be done in a variety of ways, other than described above in reference to process 900. For example, upon receiving a second request to access data, the data blocks storing the requested data and the corresponding nodes in an already generated graph may be identified. Next, it may be determined if any of the nodes are not accessed or included in the already generated master path. If so, then costs of paths to access the new nodes may be determined, and selectively added to the current master path to reduce any costs added to the master path. The process of selecting the lowest costs paths may be moderated by a depth parameter d, as described in more detail above, to not add undue complexity to determining the modified path.

In some cases, a master path may be adjusted based on other factors, to minimize resource utilization in accessing data. For example, certain requests may be delayed or moved up in the queue based on time of day (e.g., based on traffic), differing or variable cost to read the data at a certain points in time (e.g., time of day, week, etc.). In some cases, one request may be held for a certain amount of time before being processed, for example, to wait for similar requests from a same or different user device.

In some examples, if data is laid out sparsely on the storage media, the above described techniques may be used to find an optimal path for reading the data to save both, on time and read effort. For example, certain paths may be chosen and linked together to minimize an overall physical or logical distance traveled by the master path, not necessarily aligned with a shortest other cost parameter, such as time to access. In addition, the cost parameters may be changed at fixed or various points in time or in response to various stimuli, including for example, using time to access as the cost value when the system typically encounters more traffic. In this example, energy needed to access the data may be sued as the cost metric in lesser busy times of day, week etc. In this way, the described techniques may be adapted to optimize different values or metrics based on changing situational factors.

Figure 10:
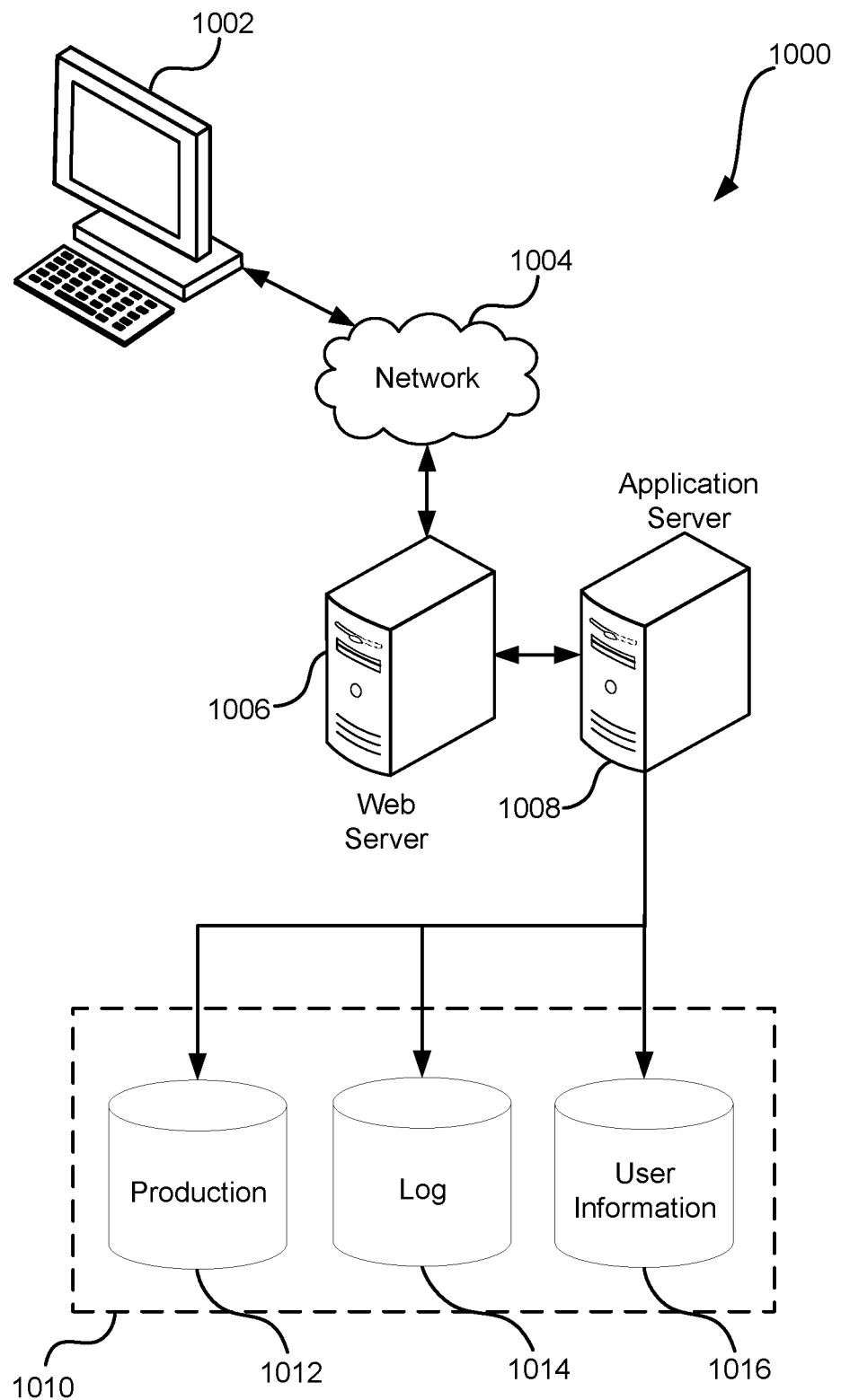
FIG. 10 illustrates a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes at least one application server 1008 and a data store 1010, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In some aspects, the web server 1006 and/or the application server 1008, in conjunction with data store 1010, may provide or instantiate one or more of the access engine 108, the access store 110, the front end 106, preliminary storage 112, and the data storage service 114. For example, the data storage service 114, access engine 108 and access store 110 may be at least in part hosted by the application server 1008.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1002 and the application server 1008, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update or otherwise process data in response thereto, and the application server 1008 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the client device 1002. Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
    a data storage device storing data in a plurality of data blocks;
    one or more processors; and
    memory to store computer-executable instructions that, if executed, cause the one or more processors to:
        receive a request to access first data from the data storage device, wherein the first data is stored on the plurality of data blocks,
        generate a directed graph comprising a plurality of nodes, wherein each of the plurality of blocks of data is represented by a node of the plurality of nodes;
        combine a number of nodes of the plurality of nodes having an access value less than a threshold to form at least one combined node in the directed graph, the number selected to reduce computational complexity of determining a master path through the directed graph for retrieving the first data;
        determine cost values associated with a plurality of paths for accessing data represented by at least two of the plurality of nodes, wherein at least one path of the plurality of paths comprises the at least one combined node;
        generate the master path through the directed graph for retrieving the first data by:
            linking at least two paths of the plurality of paths that share a node of the plurality of nodes between a start node and an end node, wherein the at least two paths are selected to reduce a combined cost value of the cost values of the at least two paths according to a calculation complexity parameter; and
            retrieve the first data based on the master path upon or after generating the master path.

2. The system of claim 1, wherein the calculation complexity parameter comprises a depth of calculation for determining an optimal path between two nodes or the at least one combined node of the plurality of nodes.

3. The system of claim 1, wherein the instructions, if executed, further cause the one or more processors to:
    sort at least a subset of the plurality of paths according to the cost values associated with at least the subset of the plurality of paths; and
    iteratively determine a set of closest paths of the plurality of paths beginning at the start node to connect the start node to the end node, wherein when more than one node is in the set, the instructions that if executed, cause the one or more processors to:
        for each node in the set, determine a shortest path using adjacent nodes, wherein the amount of nodes tested to determine the shortest path is limited by the calculation complexity parameter.

4. The system of claim 1, wherein the instructions, if executed, further cause the one or more processors to:
    limit the number of the plurality of nodes that are combined to form the at least one combined node to decrease a total cost value of the master path.

5. A method, comprising:
    generating a graph to represent a plurality of data blocks of a storage device, the graph comprising a plurality of nodes;
    combine at least two nodes of the plurality of nodes to form at least one combined node in the graph;
    obtaining a request to access first data from the data storage device, wherein the first data is associated with multiple nodes of the plurality of nodes;
    determining cost values associated with a plurality of paths for accessing data associated with the multiple nodes, each path of the plurality of paths connecting at least two of the plurality of nodes; and
    generate a directed graph through the graph for retrieving the first data by linking at least two paths of the plurality of paths between a start node and an end node, wherein the at least two paths are selected to reduce a combined cost value of the cost values of the at least two paths according to a configurable calculation complexity parameter, and wherein at least one of the at least two paths comprises the at least one combined node.

6. The method of claim 5, wherein generating the directed graph further comprises:
    iteratively determining a set of adjacent paths of the plurality of paths beginning at the start node to connect the start node to the end node, wherein when more than one node is in the set, the method further comprising:
        for each node in the set, determining a shortest path using adjacent nodes, wherein the amount of nodes tested to determine the shortest path is limited by the configurable calculation complexity parameter.

7. The method of claim 5, wherein linking the at least two paths of the plurality of paths between a start node and an end node further comprises linking paths beginning at the start node to reach the end node.

8. The method of claim 5, wherein the at least two nodes of the plurality of nodes that are combined have a cost value less than a threshold to form the at least one combined node.

9. The method of claim 8, further comprising limiting a number of the plurality of nodes that are combined to form the at least one combined node to decrease a total cost value of the directed graph and decrease complexity of generating the directed graph.

10. The method of claim 5, wherein the request comprises a first request for accessing first data and a second request for accessing second data, and wherein generating the directed graph further comprises linking multiple paths of the plurality of paths between a start node and an end node to access both the first data and the second data.

11. The method of claim 5, wherein the cost values comprise at least one of a time between accessing data from one node of the plurality of nodes to accessing data from another node of the plurality of nodes, distance between nodes, or movement characteristics of the data storage device in accessing data from one node of the plurality of nodes to accessing data from another node of the plurality of nodes.

12. The method of claim 5, wherein the data storage device comprises a directional storage media.

13. A non-transitory computer-readable storage medium having stored thereon executable instructions that, as a result of being executed by one or more processors of a computer system, cause the computer system to at least:
   obtain a request to access first data from the data storage device, wherein the first data is stored on a plurality of data blocks associated with a plurality of nodes;
   determine cost values associated with a plurality of paths for accessing data associated with at least two of the plurality of nodes, each path of the plurality of paths connecting at least two of the plurality of nodes;
   combine a number of the plurality of nodes associated with a path of the plurality of paths to form at least one combined node, the number selected to reduce computational complexity of determining a merged path to access the first data;
   connect adjacent paths of the plurality of paths to form combined paths; and
   merge at least one of the combined paths or the plurality of paths with the path to form a merged path to connect a start node to and end node of the plurality of nodes, wherein the merging is performed to minimize a total cost value comprising the cost values associated with the at least two of the combined paths or the plurality of paths that are merged.

14. The non-transitory computer-readable storage medium of claim 13, wherein the executable instructions that, as a result of being executed by one or more processors of a computer system, further cause the computer system to at least:
   select the number of nodes of the plurality of nodes having a cost value less than a threshold to form the at least one combined node.

15. The non-transitory computer-readable storage medium of claim 13, wherein the instructions for merging the at least two of the combined paths or the plurality of paths to form the merged path further comprises executable instructions that, as a result of being executed by one or more processors of a computer system, further cause the computer system to at least:
   iteratively merge the at least two of the combined paths or the plurality of paths beginning at the start node to reach the end node.

16. The non-transitory computer-readable storage medium of claim 13, wherein the instructions, as a result of being executed by one or more processors of a computer system, further cause the computer system to at least:
   merge the at least two of the combined paths or the plurality of paths according to a conditional nearest neighbor criteria.

17. The non-transitory computer-readable storage medium of claim 13, wherein the start node corresponds to a read position of the data storage device.

18. The non-transitory computer-readable storage medium of claim 17, wherein the executable instructions that, as a result of being executed by one or more processors of a computer system, further cause the computer system to at least:
   obtain a second request to access second data from the data storage device; and
   modify the merged path to access the second data based on an updated read position of the data storage device.

19. The non-transitory computer-readable storage medium of claim 13, wherein the cost values comprise at least one of a time between accessing data from one node of the plurality of nodes to accessing data from another node of the plurality of nodes, distance between nodes, or movement characteristics of the data storage device in accessing data from one node of the plurality of nodes to accessing data from another node of the plurality of nodes.

20. The non-transitory computer-readable storage medium of claim 13, wherein the data storage device comprises a non-directional storage media.

\* \* \* \* \*